United States Patent Office 2,744,887
Patented May 8, 1956

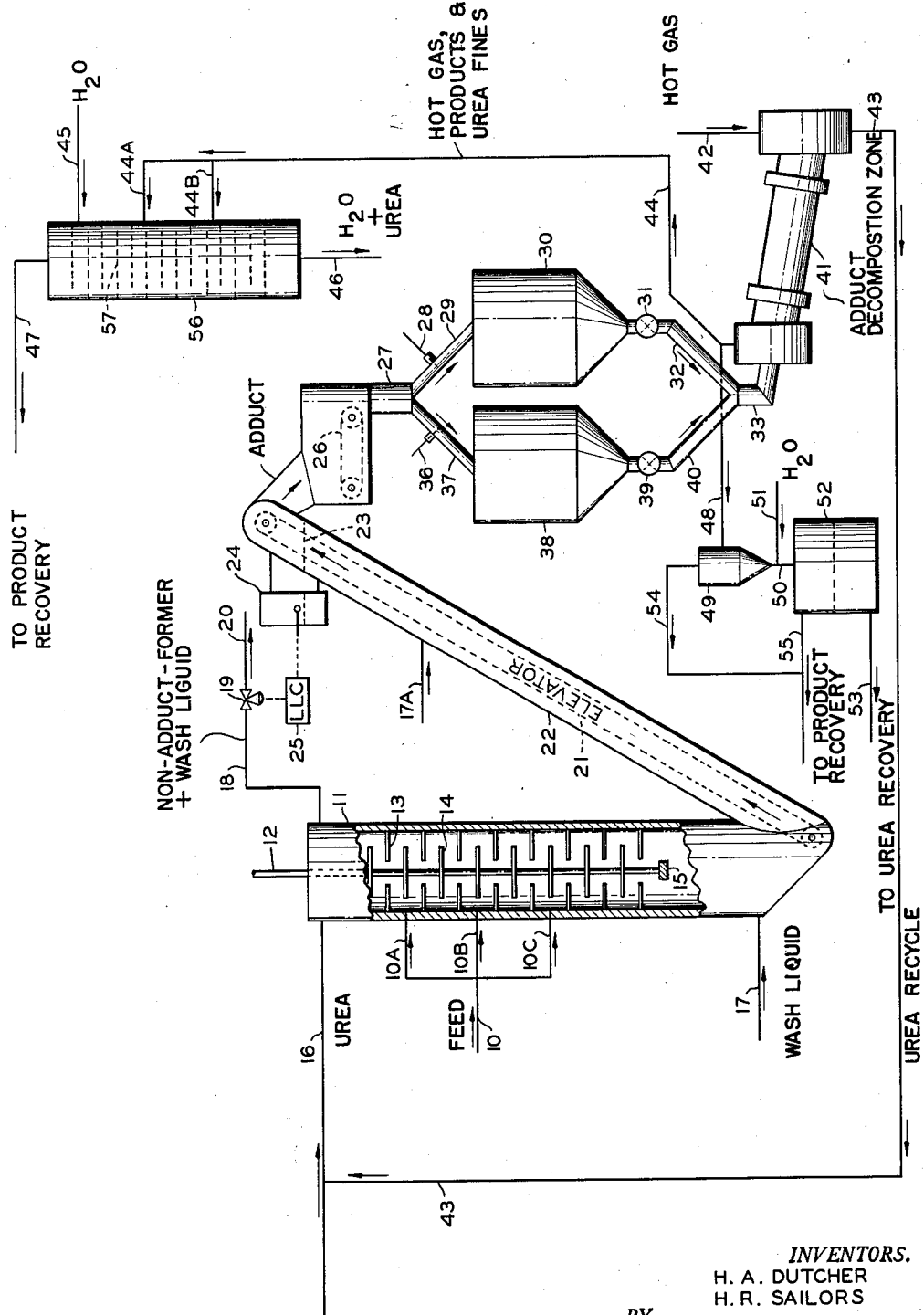

2,744,887

DECOMPOSING UREA ADDUCTS BY COUNTERCURRENTLY CONTACTING THE UREA ADDUCT WITH A HOT GAS, REMOVING THE UREA FINES AND RECYCLING THE LARGER UREA PARTICLES

Harris A. Dutcher and Howard R. Sailors, Bartlesville, Okla., assignors to Phillips Petroleum Company, a corporation of Delaware Application August 3, 1950, Serial No. 177,456

13 Claims. (Cl. 260—96.5)

This invention relates to a process for the formation of adducts of urea or thiourea with an adduct-forming compound. In one of its aspects, this invention relates to a process for the separation of an adduct-forming compound from a non-adduct-forming compound. In another of its aspects, the invention relates to a method for the recovery of undesirably fine particles of urea or thiourea in a system wherein crystals of said urea or thiourea are employed to form an adduct with an adduct-forming compound.

There has recently been discovered a process for the preparation of an adduct of urea or thiourea with certain organic compounds. Such a process has found ready application in the separation of hydrocarbons in accordance with their chain types by forming adducts selectively between the hydrocarbons and urea or thiourea. Thus, mixtures of a straight carbon atom chain hydrocarbon, such as n-octane, and a branched carbon atom chain hydrocarbon, such as isooctane, can be separated into separate fractions of straight chain and branched chain hydrocarbons by treating such mixtures with urea which forms a crystalline adduct with the straight chain hydrocarbon but not with the branched chain hydrocarbon, or by treating with thiourea which forms a crystalline adduct with the branched chain hydrocarbons but not with the straight chain hydrocarbons. The resulting crystalline adduct can be readily separated from the remaining non-adduct-forming hydrocarbons and then decomposed by heating to a suitable decomposition temperature, usually from about 130 to 180° F., in order to liberate the adducted hydrocarbon. There have also been proposed processes for the preparation of such adducts wherein the urea or thiourea is passed as a crystalline mass downwardly through a column to form a moving bed therein. In such processes, the hydrocarbon mixture to be separated is introduced at an intermediate point into the moving bed wherein the adduct-forming hydrocarbon will become adducted with the urea or thiourea and can be removed as a crystalline solid from the bottom of the moving bed. The non-adduct-forming hydrocarbon is removed from the top of the bed in the liquid phase. In such a process, the particles of adduct formed within the moving bed are often soft and fluffy and their movement as part of the bed tends to cause their disintegration into particles which, after heating to a decomposition temperature, result in urea or thiourea particles too fine for re-use in the adduct-forming reaction. Although such fine particles of urea or thiourea will react to form an adduct, these fine particles as well as any fine particles of a resulting adduct will tend to be carried from the bed by the non-adduct-forming hydrocarbon thereby resulting in the latter's contamination. Still further, it has been proposed to decompose the crystalline adducts formed in an adduct-forming process by suspending them in a heated inert gaseous carrier in such a manner as to form a fluidized bed wherein the heat from the gaseous carrier acts to liberate the urea or thiourea, as the case may be, and the adducted hydrocarbon. In such a system, there will be formed considerable amounts of fine particles of urea or thiourea due to attrition of the crystals of urea or thiourea in the fluidized bed so that the recovered urea or thiourea will comprise a mixture of crystals sufficiently large to be reemployed in the adduct-forming process and crystals too fine to be suitably reemployed therein. As stated, reemployment of such undesirably fine particles of urea or thiourea results in contamination of the product non-adduct-forming hydrocarbon stream. It can also result in clogging of the moving bed in the adduct-forming zone causing an excessive pressure drop therethrough. Also, the reaction of urea or thiourea crystals to form an adduct results in the swelling thereof so that the fine particles tend to compact and "cement-up" the larger particles of adduct to such an extent that the countercurrent flow of non-adduct-forming hydrocarbon therethrough is substantially hindered. Obviously, it would be highly advantageous to possess a means for removing and recovering fine particles of urea or thiourea from an adduct-forming process to prevent contamination of the hydrocarbon or other products and to prevent other difficulties occasioned by such fine particles.

It has now been found that an adduct-forming compound can be separated from admixture with a non-adduct-forming compound by contacting it with a moving bed of an amide selected from the group consisting of urea or thiourea, thermally decomposing the resulting adduct, separating the urea or thiourea following decomposition of said adduct into a fraction having a suitable particle size for re-use in the adduct-forming zone and a fraction having a particle size smaller than that desired for re-use in the adduct-forming zone, and then processing said fine particles to produce larger crystals which can be returned to the adduct-forming zone. The thermal decomposition of the adduct formed in the adduct-forming zone is preferably accomplished in a rotary kiln type of apparatus into which the adduct is fed at one end and a hot inert gaseous heat carrier into the other end to pass countercurrently to the adduct through the kiln. The velocity of the gaseous heat carrier is adjusted to hydraulically sort undesirably fine particles of liberated urea or thiourea from the mass of crystalline material being tumbled therethrough by the kiln and to carry such particles in suspension from the kiln. The gaseous suspension of fine particles of urea or thiourea can then be passed to recovery zone wherein the urea or thiourea can be separated, such as by a water wash, from the gaseous carrier and then crystallized to form crystals of urea or thiourea of a size suitable for use in the adduct-forming zone. When operating in this manner, the fine particles of crystalline material formed in the moving bed adduct-forming zone as well as those formed in the adduct-decomposition zone are removed from the process and recovered for re-use and are not permitted to accumulate in the system to such an extent that any serious difficulty is experienced.

Thus it is an object of this invention to provide a process for preparing and decomposing an adduct of urea or thiourea and an adduct-forming organic compound wherein said adduct is formed by contacting the adduct-forming compound with a moving bed of urea or thiourea and wherein the resultant adduct is thermally decomposed by contact with a hot gaseous medium which serves to supply heat for decomposing said adduct and also to carry undesirably fine particles of said urea or thiourea from the adduct decomposition zone.

It is another object to provide a simplified process for decomposing an adduct wherein a major portion of urea or thiourea is recovered in a form suitable for direct use in an adduct-forming reaction and only a minor portion too fine for direct use is processed to convert it to a form suitable for use in said reaction.

It is another object of this invention to provide a process for the separation of an adduct-forming compound from a non-adduct-forming compound by contacting a mixture thereof with a moving bed of a crystalline amide selected from the group consisting of urea or thiourea wherein fine particles of said amide formed in the adduct-forming zone are prevented from accumulating in the adduct-forming zone and are recovered as particles having a suitable size for re-use in the adduct-forming reaction.

Still another object of this invention is to provide a process for the separation of an adduct-forming compound from admixture with a non-adduct-forming compound by selectively forming an adduct thereof with urea or thiourea in a moving bed wherein fine particles of urea or thiourea formed in said bed and in a subsequent adduct decomposition zone are removed from the system thereby preventing contamination of the product adduct-forming and non-adduct-forming fractions with said fine particles.

Various other objects, advantages and features of this invention will become apparent from the following detailed description taken in conjunction with the accompanying drawing wherein there is shown a preferred embodiment of this invention.

In the drawing, a liquid feed material which can be an adduct-forming organic compound or an admixture of such compounds but which is preferably an admixture of such compound with a non-adduct-forming compound is introduced through line 10 and one or more of the feed lines 10A, 10B or 10C to column 11. A crystalline amide selected from the group consisting of urea or thiourea and which can be activated with methanol is introduced in the upper portion of column 11 through line 16. The amide passes downwardly by gravity through the column as a moving bed and contacts the rising feed material and thereby preferentially forms an adduct with the adduct-forming compound of the feed. A washing medium which can be a low boiling hydrocarbon such as butane or pentane is introduced below the feed point through line 17. The washing medium is selected to be of such nature that it is non-adduct-forming under the conditions existing in column 11 and upon rising through the descending column of urea, washes out the occluded but unreacted non-adduct-forming compound from the solid material passing downwardly through column 11.

To insure proper operation of column 11, that is, to prevent agglomeration of the amide or of the adduct as well as to prevent channeling and other troubles, shaft 12, fitted with cross pieces 14 and resting on thrust bearing 15, is continuously rotated within column 11. Bars 13, attached radially to column 11 in positions indicated in the drawing, co-operate with cross members 14 in preventing agglomeration of the urea and in assuring smooth flow of the solid bed downwardly through column 11 without any stoppages caused by bridging over of the column by adduct crystals which, during their formation, tend to swell and compact in column 11. Shaft 12 is rotated by means of a source of power (not shown). Inasmuch as the adduct-forming reaction is exothermic and since it is often desirable to control the temperature in column 11 to prevent the exothermic heat from raising the temperature thereof or to maintain the temperature therein at a sub-atmospheric level, bars 13 can be replaced by suitable cooling elements such as U-shaped bayonet-type cooling tubes adapted to be inserted in the sides of column 11 for closed circulation of a coolant or refrigerant therethrough.

The solid which comprises the desired adduct descends to the bottom of the column and is picked up by bucket elevator 21 (buckets not shown) in housing 22 and conducted upwardly above liquid level 23. The liquid in the bottom of column 11 and throughout housing 22 is the washing medium. In order to provide a maximum washing of the adduct, the washing medium can be introduced into elevator housing 22 via line 17A. The rate of removal of unreacted non-adduct-forming compound which contains washing medium from column 11 through line 18, valve 19, and line 20 is controlled by liquid level indicator 24 actuated by liquid level 23. Any rise of liquid level 23 is sensed by indicator 24 which transmits a signal to liquid level controller 25 which, in turn, actuates valve 19 to increase the rate of removal of material through line 18. A lowering of liquid level 23 initiates in a similar manner a corresponding lowering in the rate of such material's removal. Liquid level 23, as shown in the drawing, is maintained at a position higher than the juncture of line 18 with column 11 thereby providing a differential head of liquid to force the passage of the washing medium and unreacted non-adduct-forming compound from the feed material upwardly in the column and eventually out through line 18. The material removed through lines 18 and 20 is conducted to a recovery zone described hereafter.

The solid material including adduct formed in column 11 as well as unreacted amide is carried upwardly by bucket elevator 21 and is drained of liquid after rising above liquid level 23. The drained solid is emptied onto a drag conveyor 26 and is transported horizontally to be dumped into conduit 27. Hoppers 30 and 38 are used as temporary storage for this solid material which is directed to the chosen hopper by suitably opening and closing slide valves 28 and 36 contained in conduits 29 and 37. With the valves in the position shown in the drawing, the solid material is directed to hopper 30 for temporary storage. With hopper 30 being used as temporary storage, hopper 38 is used as a source of feed. The rate of removal of solid from hopper 38 is controlled by star valve 39, the solid passing therethrough to conduits 40 and 33 to be introduced into rotary kiln 41. In the kiln, the rotation of the kiln tumbles the crystalline adduct through a stream of an inert hot gaseous heat carrier introduced through line 42 at the opposite end of the kiln. The solid and gas thus pass countercurrently to each other. By means of the hot gas and auxiliary heating, if desired, the kiln is maintained at a temperature between 125 and 200° F., preferably between 130 and 180° F. The velocity of the gas passing through kiln 41 is maintained sufficiently high to suspend particles of amide and/or adduct which are too fine to be suitable for direct recycle to column 11. The gas velocity is, however, low enough to allow those particles large enough to result in amide crystals suitable for direct recycle to pass downwardly through the kiln, and these crystals of amide are removed through line 43 and recycled to column 11. Although the optimum velocity of the gaseous regeneration medium will depend upon a number of factors such as the size of crystals of amide desired to be removed therein from kiln 41, the extent of agitation or tumbling of crystalline material in kiln 41 and the amount of undesirably fine particles of amide to be removed and can best be determined by means of mere routine test, it is ordinarily satisfactory to maintain such velocity within the range of 3 to 50, preferably 10 to 25, feet per second through kiln 41.

In passing through the hot kiln, the adduct is decomposed and the liberated adduct-forming compound can be carried out in the vapor state along with the hot carrier gas through line 44, and conducted to tower 56 introduced thereto through line 44A and/or 44B. When the boiling point of the adduct-forming compound is above the decomposition temperature maintained in kiln 41, such liberated compound and the amide can be removed together from kiln 41 through line 43 and then separated by any suitable means, such as filtration, while maintaining the temperature above the adduct-forming temperature of the particular adduct-forming compound.

Tower 56 contains baffles 57 to insure good contact of cooling water or other solvent having a preferential solvent power for the amide with respect to the adduct-forming compound. Such water is introduced through line 45 and passes downwardly to contact the gas and suspended fine crystals of amide. The cool water condenses the rising gas and dissolves the amide. The condensed adduct-forming compound rises to the top of the tower and is removed through line 47 and conducted to a product recovery zone to be described. The water is removed from tower 56 through line 46 and conducted to an amide recovery zone (not shown). The recovery of the amide is readily effected by conventional evaporation of the water and reforming larger crystals of amide which are of a suitable size for utilization in tower 11.

It is thus seen that the process of the present invention avoids dissolving and recrystallizing any of the amide except that unsuitable for direct utilization in the adduct-forming zone, and consequently effects conversion of fine particles of amide to the larger crystal sizes at minimum cost.

The material removed through line 47 contains some of the washing medium introduced into column 11 through line 17 or 17A and occluded on the adduct particles to be vaporized therefrom in kiln 41. The vaporized washing medium is condensed in column 56 and carried therefrom through line 47 in admixture with carrier gas, and the liberated adduct-forming compound. Such admixture is conducted to a fractional distillation zone (not shown) wherein the adduct-forming compound is separated and conducted to product storage and the washing medium and carrier gas separately recovered and recycled to the process, if desired.

The material removed through line 20 consists substantially of washing medium from column 11 and lines 17 or 17A and the non-adduct-forming compound. This material can be conducted to a fractional distillation zone wherein the washing medium can be separated and returned to column 11 and the remaining non-adduct-forming compound can be conducted to storage as a product of the process.

Alternatively the carrier gas from kiln 41 which contains the suspended amide fines and adduct-forming compounds can be removed from kiln 41 through line 48 and introduced into cyclone separator 49. The solids carried by this stream are separated in the cyclone separator and removed therefrom through line 50 to be dissolved in water introduced through line 51. The entire stream of water and dissolved amide is conducted to a separator such as tank 52. In separator 52, the adduct-forming compound separates as an upper phase, and water containing the dissolved amide forms a lower phase. The aqueous or lower phase is removed from separator through line 53 and processed to recover the amide in a manner such as that described for the stream removed through line 46.

The gaseous stream, after solids separation, is removed from cyclone 49 through line 54. The hydrocarbon separated in tank 52 can be added through line 55 to the gaseous stream passing through line 54. The total stream is then conducted to a product recovery zone and processed in a manner similar to that described for the stream carried in line 47.

The activator, such as methanol, employed to activate the amide can be recovered for recycle when tower 56 is used by separating the activator from the water vaporized in the crystallization operation conducted for recovery of the amide removed through line 56. When the method embodying the cyclone separator is utilized, the activator is suitably recovered by any suitable means, such as fractional distillation, from its water solution for recycle during the product recovery operation practiced on the stream from line 54.

Although the concept of this invention is applicable to a process for forming an adduct of any compound capable of forming an adduct with an amide selected from the group consisting of urea or thiourea and to a process for the separation of any compound capable of forming an adduct with urea or thiourea from admixture with a compound not capable of forming such adduct with urea or thiourea, respectively, a general description of the types of compounds which do and do not form adducts will be given in order to better illustrate the applicability of the process of this invention.

In general, an adduct can be formed by contacting a straight carbon atom chain organic compound with urea in the presence of an activator-solvent, such as methanol, water or the like. Alternatively, a branched carbon atom chain compound can be contacted with thiourea in the presence of such an activator-solvent to produce an adduct. The straight-chain compound can be admixed with a branched-chain organic compound, the latter of which, in general, do not form adducts with urea. The straight-chain compound can comprise one or more of a normal alkane or alkene hydrocarbon having from 6 to 50 carbon atoms in the molecule such as hexane, the hexenes, heptane, the heptenes, octane, the octenes, nonane, the nonenes, decane, the decenes and progressively higher molecular alkanes and alkenes including those having 50 carbon atoms. The straight carbon atom chain compound can also be a primary alcohol having from 6 to 50 carbon atoms and being saturated or unsaturated and thus corresponds in carbon atom configuration to the straight-chain hydrocarbons above-mentioned. Urea will also form adducts with such straight carbon atom chain compounds as primary amines having from 8 to 50 carbon atoms per molecule, mercaptans having from 6 to 50 carbon atoms per molecule, ketones having from 6 to 50 carbon atoms per molecule and esters of organic acids having from 6 to 50 carbon atoms per molecule.

Urea does not form adducts with branched carbon atom chain organic compounds nor with cyclic or aromatic organic compounds such as isohexane, methyloctane, cyclohexane, benzene, toluene and cymene. When employing urea in a process of this invention to separate an adduct-forming straight-chain compound from a non-adduct-forming branched-chain or cyclic compound, any one or more of the straight carbon atom organic compounds illustrated above can be admixed with one or more of the non-adduct-forming compounds.

Thiourea forms adducts with branched carbon atom chain organic compounds but does not form adducts with straight carbon atom chain organic compounds nor with aromatic compounds. Thus, adduct-forming power of thiourea is substantially opposite to that of urea in that thiourea forms adducts with branched-chain organic compounds and not with straight-chain organic compounds, while urea forms adducts with the straight-chain organic compounds but not with the branched-chain organic compounds. Thus, thiourea can form adducts with such compounds as the branched carbon atom chain alkane and alkene hydrocarbons having from 5 to 50 carbon atoms in the straight-chain portion of the molecule and from 1 to 20 carbon atoms in a side chain. Illustrative of such compounds are isohexane, ethylhexane, isohexene, isoheptane, isoheptene, ethylheptane, ethylcyclooctane, trimethylnonane, cyclohexane, cyclooctane, and methylcyclohexane. Thiourea also forms an adduct with a secondary or tertiary alcohol having from 5 to 50 carbon atoms in the straight chain portion of the molecule and from 1 to 20 carbon atoms in the side chain; with a secondary and tertiary amine having at least 7 carbon atoms per molecule, with a mercaptan having from 5 to 50 carbon atoms in the straight chain portion of the molecule and from 1 to 20 carbon atoms in a side chain; and with a ketone having from 5 to 50 carbon atoms in the straight chain portion of the molecule and 1 to 20 carbon atoms in a side chain. Thiourea also forms an adduct with various cycloparaffins having at least 6 carbon atoms in the cyclic portion of the molecule and which can or cannot contain various side chains containing 1 or more carbon atoms per chain, such as cyclohexane, cycloheptane, cyclooctane, cyclononane, methylcyclohexane, and dimethylcyclooctane. Thiourea can be employed as the adduct-forming material to separate a mixture of one or more compounds which form adducts therewith from one or more compounds which do not form adducts with thiourea.

The foregoing specific examples of compounds capable of forming an adduct with urea or thiourea is not exhaustive but is demonstrative of the types of compounds to which the process of this invention can be applied. Other compounds not specifically named above can be readily suggested by those skilled in the art upon reading the disclosure of the instant invention and an exhaustive listing of all organic compounds capable and not capable of forming an adduct with urea or thiourea would not aid in an understanding of the present invention.

A more detailed description of the compounds which do or do not form adducts with urea or thiourea can be found in application Serial No. 155,061, filed April 10, 1950, by W. N. Axe and in application Serial No. 155,134, filed April 10, 1950, by Joseph I. Ackerman, Jr., and the disclosures contained therein are herein incorporated by reference for a more complete discussion of the compounds capable of forming such adducts.

As stated, the urea or thiourea employed in the process of this invention is activated by a suitable activator. Among such activators are water; low boiling aliphatic alcohols such as methanol and ethanol; the low boiling esters such as methyl acetate; and ammonia or a substituted ammonia such as ethylamine, methylamine, dimethylamine, ethanolamine, trimethylamine or other heterocyclic nitrogen-containing compounds such as pyridine, pyrazole, picoline and such. The amount of activator employed is preferably just sufficient to wet the surface of the amide particles although it can be within the range of 0.05 to 10, preferably from 0.1 to 7, weight per cent of the amide.

The conditions employed in adduct-forming zone 11 in order to perform the desired adduct-forming functions therein will depend somewhat upon the nature of the feed material, the desired degree of separation and upon numerous other factors. In general, the temperature maintained in adduct-forming zone 11 to induce the formation of an adduct should be within the range of minus 70 to 120° F., preferably from about 0° to 100° F. Obviously, when a temperature below the freezing point of water is employed, water cannot be employed as an activator, and accordingly, another activator such as methanol or ethanol should be employed in such instances. The pressure employed in adduct-forming zone 11 should be sufficient to maintain the feed material in a liquid phase therein and, accordingly, will vary with the nature of such feed. Ordinarily, it is preferred to operate at substantially atmospheric pressure when the feed material has a boiling point which will permit operation in a liquid phase at such pressure. Higher pressures such as those within the range of 10 to 500 pounds per square inch can be employed if desired or when the boiling point of the feed so demands. The amount of urea or thiourea employed in adduct-forming zone 11 will depend upon the nature of the adduct to be formed and upon the concentration of the adduct-forming compound in the feed. Ordinarily, the amount of urea or thiourea employed should be within the range of 1 to 20 mols per mol of adduct-forming compound in the feed. The residence time of the urea or thiourea in adduct-forming zone 11 should be sufficient to insure substantially complete removal of the adduct-forming compound from the feed material. A residence time within the range of 5 minutes to 2 hours, preferably from 10 to 30 minutes, will be satisfactory.

The amount of wash liquid introduced into the adduct-forming zone through line 17 should be sufficient to remove substantially all occluded but unreacted non-adduct-forming compounds from the crystals of adduct being removed from column 11. The amount employed will also depend upon the desired degree of separation between the adduct-forming and the non-adduct forming compounds. Ordinarily, there can be employed an amount within the range of 1 to about 50, preferably from about 3 to 10, gallons of wash liquid per cubic foot of solid crystalline material passing out the lower end of adduct-forming zone 11.

The conditions employed in thermal decomposition zone 41 will depend upon the decomposition temperature at which the particular adduct decomposes therein and upon numerous other factors, such as the residence time of the adduct in such decomposition zone, the extent of agitation provided by such zone and the desired degree of decomposition of said adduct contained therein. Ordinarily, a decomposition temperature within the range of 125 to 200° F., preferably from 130 to 180° F., is maintained in the decomposition zone. If desired, higher temperatures can be employed provided that the maximum temperature is maintained below the melting point of urea (271° F.) or below the melting point of thiourea (356° F.). Thus, the temperature of the heating medium introduced through line 42 into decomposition zone 41 should be substantially within the aforesaid temperature ranges since the transfer of heat between said medium and the adduct to be composed is very efficient and the temperature of the solid material in kiln 41 will be substantially the same as the gas therein. The amount of such decomposition medium employed will depend somewhat upon the temperature and should be sufficient to provide enough heat to decomposition zone 41 to afford a ready decomposition of the adduct contained therein. Ordinarily, a volume of gas within the range of 5 to 100, preferably 10 to 35, cubic feet per cubic foot of adduct can be employed. The velocity of the gas flowing through decomposition zone 41 should be adjusted to carry the undesirably fine particles of liberated urea or thiourea therefrom in order that they can be recovered as above described for recycling to the adduct-forming zone. Although the exact velocity of the gas passing through decomposition zone 41 can best be determined by mere routine test and will depend upon the desired degree of separation between the fine and coarse particles of urea or thiourea, a gas velocity within the range of 3 to 50, preferably from 10 to 25, feet per second will be satisfactory. Ordinarily, it is preferred to remove the particles of urea or thiourea which have a mesh size smaller than 200 meshes per inch although the process of this invention can be employed to remove particles having a larger or a smaller mesh size.

Recovery tower 56 and separator 52 are employed under such conditions that the amide and the adduct-forming compound do not re-form an adduct therein. It has been found that such non-adduct-forming conditions can be maintained by employing sufficient water in tower 56 or separator 52 to prevent re-forming of an adduct. Generally, any amount of water in excess of 16 weight per cent of the amide present will prevent reformation of an adduct. However, it is preferred to employ an even greater amount in order to thoroughly wash the amide from the adduct-forming compound product and to provide for cooling thereof. Thus, it is preferred to employ an amount of water within the range of 0.5 to 5, more preferably 1 to 3, pounds per pound of amide present in tower 56 or separator 52. The temperature employed in tower 56 and separator 52 can be within the range of 50 to 150° F., preferably 70 to 90° F.

Although only a single kiln 41 has been described, a plurality of kilns having a series flow of solid material therethrough can be provided. When operating in such manner, the gaseous heat carrier is introduced into each kiln in a parallel manner and each stream so introduced can be at a temperature which will cause a selective decomposition of the adduct. Thus, the adducts formed between an amide selected from the group consisting of urea and thiourea and increasingly higher molecular weight adduct-forming organic compounds will decompose at increasingly higher temperatures so that it is possible to operate a series of kilns each at a temperature higher than that of the previous kiln to selectively decompose a mixture of different adducts.

While the invention has been described in connection with a present, preferred embodiment thereof, it is to be understood that this description is illustrative only and is not intended to limit the invention, the scope of which is defined by the appended claims.

We claim:

1. A process for separating an organic compound capable of forming an adduct with an amide selected from the group consisting of urea and thiourea from admixture with an organic compound not capable of forming such an adduct which comprises continually moving particles of said amide downwardly as an aggregate mass by gravity flow through an adduct-forming zone, continually feeding said admixture of organic compounds into said adduct-forming zone at an intermediate point therein at such a rate that the mol ratio of said amide to the adduct-forming compound is within the range of 1:1 to 20:1, maintaining said adduct-forming zone at a temperature within the range of minus 70 to 120° F. and under sufficient pressure to maintain liquid phase conditions therein, withdrawing non-adduct-forming compound from the upper portion of said adduct-forming zone, adding a washing medium comprising a non-adduct-forming low boiling hydrocarbon to the lower portion of said adduct-forming zone at a rate within the the range of 1 to 50 gallons per cubic foot of adduct whereby any non-adduct-forming compound occluded on the adduct is removed therefrom, passing the washed adduct formed in said adduct-forming zone to a decomposition zone, passing an inert gaseous heat carrier at a temperature within the range of 125 to 200° F. through said decomposition zone countercurrently to said adduct passing therethrough and at a velocity within the range of 3 to 50 feet per second, continuously tumbling said adduct transversely through said heat carrier gas whereby said adduct is decomposed to liberate said adduct-forming compound and said amide and whereby undesirably fine particles of said liberated amide are removed from said decomposition zone in suspension in said carrier gas along with the liberated adduct-forming compound contained therein, returning the coarser particles of said amide to said adduct-forming zone, countercurrently contacting said carrier gas containing said fine particles of said amide and said liberated adduct-forming compound with water at a temperature within the range of 50 to 150° F. and at a rate within the range of 0.5 to 5 pounds of water per pound of said amide, crystallizing the resultingly dissolved amide from said water and returning the recovered crystals to said adduct-forming zone.

2. A process for separating an organic compound capable of forming an adduct with an amide selected from the group consisting of urea and thiourea from admixture with an organic compound not capable of forming such an adduct which comprises continually moving particles of said amide downwardly as an aggregate mass by gravity flow through an adduct-forming zone, continually feeding said admixture of organic compounds into said adduct-forming zone, maintaining said adduct-forming zone at a temperature within the range of minus 70 to 120° F., withdrawing non-adduct-forming compound from the upper portion of said adduct-forming zone, adding a washing medium comprising a non-adduct-forming low boiling hydrocarbon to the lower portion of said adduct-forming zone to wash any non-adduct-forming compound from said occludued adduct, passing the washed adduct to a decomposition zone, passing an inert heat carrier gas at a temperature within the range of 125 to 200° F. through said decomposition zone countercurrently to said adduct passing therethrough and at a velocity within the range of 3 to 50 feet per second, continuously tumbling said adduct transversely through said heat carrier gas whereby said adduct is decomposed, and thereby removing undesirably fine particles of liberated amide separated from coarser particles of size greater than 200 mesh from said decomposition zone in suspension in said carrier gas, countercurrently contacting said carrier gas containing said fine particles of said amide with sufficient water to dissolve said amide therein, crystallizing the resultingly dissolved amide from said water solvent and returning the recovered crystals to said adduct-forming zone.

3. A process for separating an organic compound capable of forming an adduct with an amide selected from the group consisting of urea and thiourea from admixture with an organic compound not capable of forming such an adduct which comprises continually moving particles of said amide as an aggregate mass through an adduct-forming zone, feeding said admixture of organic compounds into said adduct-forming zone to form an adduct therein, withdrawing non-adduct forming compound from the upper portion of said adduct-forming zone, adding a non-adduct-forming washing medium to the lower portion of said adduct-forming zone to remove any non-adduct-forming compound from said adduct, passing the washed adduct formed in said adduct-forming zone to a decomposition zone, passing an inert heat carrier gas heated to a temperature to decompose said adduct through said decomposition zone countercurrently to said adduct passing therethrough and at a velocity within the range of 3 to 50 feet per second, continuously tumbling said adduct transversely through said heat carrier gas whereby undersirably fine particles of said liberated amide are suspended in said carrier gas and separated from coarser particles of size greater than 200 mesh, countercurrently contacting said carrier gas containing said fine particles of said amide with sufficient water to dissolve said amide therein and recovering the resultingly dissolved amide from said water solvent in a crystalline form suitable for re-use in said adduct-forming zone.

4. A process for separating an organic compound capable of forming an adduct with an amide selected from the group consisting of urea and thiourea from admixture with an organic compound not capable of forming such an adduct which comprises contacting an aggregate mass of moving particles of said amide in an adduct-forming zone, with said admixture of organic compounds to form an adduct, adding a non-adduct-forming washing medium to the lower portion of said adduct-forming zone to remove any non-adduct-forming compound from said adduct, passing the washed adduct to a decomposition zone, passing an inert heat carrier gas at a temperature sufficient to decompose said adduct through said decomposition zone countercurrently to said adduct passing therethrough and at a velocity sufficient to suspend therein undesirably fine particles of liberated amide therein and separate same from coarser particles of size greater than 200 mesh, concomitantly tumbling said adduct transversely through said heat carrier gas, countercurrently contacting said carrier gas containing said fine particles of said amide with water and crystallizing the resultingly dissolved amide from said water solvent.

5. A process for separating an organic compound capable of forming an adduct with an amide selected from the group consisting of urea and thiourea from admixture with an organic compound not capable of forming such an adduct which comprises contacting an aggregate mass of moving particles of said amide in an adduct-forming zone with said admixture of organic compounds, passing the adduct formed in said adduct-forming zone to a decomposition zone, passing an inert heat carrier gas heated to a temperature sufficient to decompose said adduct through said decomposition zone countercurrently to said adduct passing therethrough and at a velocity sufficient to suspend undesirably fine particles of liberated amide therein of particle size smaller than 200 mesh and separate same from coarser particles, within the range of 3 to 50 feet per second, tumbling said adduct transversely through said heat carrier gas, contacting said carrier gas containing said undesirably fine particles of said amide with water in an amount sufficient to dissolve said amide and crystallizing the resulting dissolved amide from said water in a size suitable for reuse in said adduct-forming zone.

6. A process for separating a hydrocarbon capable of forming an adduct with an amide selected from the group consisting of urea and thiourea from admixture with a hydrocarbon not capable of forming such an adduct which comprises moving particles of said amide as an aggregate mass through an adduct-forming zone, feeding said admixture of hydrocarbons into said adduct-forming zone at an intermediate point therein, maintaining said adduct-forming zone at a temperature within the range of minus 70 to 120° F. and under sufficient pressure to maintain liquid phase conditions therein, withdrawing non-adduct forming hydrocarbon from the upper portion of said adduct-forming zone, adding a washing medium which comprises a non-adduct-forming low boiling hydrocarbon to the lower portion of said adduct-forming zone whereby any non-adduct-forming hydrocarbon occluded on said adduct is removed therefrom, passing the washed adduct to a decomposition zone, passing an inert heat carrier gas heated to a temperature within the range of 125 to 200° F. through said decomposition zone countercurrently to said adduct passing therethrough and at a velocity within the range of 3 to 50 feet per second, tumbling said adduct transversely through said heat carrier gas whereby said adduct is decomposed to liberate said adduct-forming hydrocarbon and said amide and whereby undesirably fine particles of said liberated amide are separated from coarser particles of size greater than 200 mesh removed from said decomposition zone in suspension in said carrier gas along with the liberated adduct-forming hydrocarbon contained therein, countercurrently contacting said carrier gas containing said fine particles of said amide and said liberated adduct-forming hydrocarbon with water and crystallizing the resultingly dissolved amide from said water.

7. A process for separating an organic compound capable of forming an adduct with an amide selected from the group consisting of urea and thiourea from admixture with an organic compound not capable of forming such an adduct which comprises contacting a moving bed of particles of said amide in an adduct-forming zone with said admixture of organic compounds to form an adduct, passing said adduct to a decomposition zone, passing an inert heat carrier gas at an elevated temperature through said decomposition zone countercurrently to said adduct passing therethrough, continuously tumbling said adduct transversely through said heat carrier gas whereby said adduct is decomposed to liberate said adduct-forming compound and said amide and whereby undesirably fine particles of said liberated amide are separated from coarser particles of size greater than 200 mesh and are removed from said decomposition zone in suspension in said carrier gas, and continuously passing only amide of size greater than 200 mesh to said adduct-forming zone.

8. A process for separating an organic compound capable of forming an adduct with an amide selected from the group consisting of urea and thiourea from admixture with an organic compound not capable of forming such an adduct which comprises continually moving particles of said amide downwardly as an aggregate mass by gravity flow through an adduct-forming zone, continually feeding said admixture of organic compounds into said adduct-forming zone at an intermediate point therein at such a rate that the mol ratio of said amide to the adduct-forming compound is within the range of 1:1 to 20:1, maintaining said adduct-forming zone at a temperature within the range of minus 70 to 120° F. and under sufficient pressure to maintain liquid phase conditions therein, withdrawing non-adduct forming compound from the upper portion of said adduct-forming zone, adding a washing medium comprising a non-adduct-forming low boiling hydrocarbon to the lower portion of said adduct-forming zone at a rate within the range of 1 to 50 gallons per cubic foot of adduct whereby any non-adduct-forming compound occluded on the adduct is removed therefrom, passing the washed adduct formed in said adduct-forming zone to a decomposition zone, passing an inert gaseous heat carrier at a temperature within the range of 125 to 200° F. through said decomposition zone countercurrently to said adduct passing therethrough and at a velocity within the range of 3 to 50 feet per second, continuously tumbling said adduct transversely through said heat carrier gas whereby said adduct is decomposed to liberate said adduct-forming compound and said amide and whereby undesirably fine particles of said liberated amide are removed from said decomposition zone in suspension in said carrier gas along with the liberated adduct-forming compound contained therein, returning the coarser particles of said amide to said adduct-forming zone, separating said carrier gas from said fine particles of said amide, contacting said separated particles with water at a temperature within the range of 50 to 150° F. and at a rate within the range of 0.5 to 5 pounds of water per pound of said amide, crystallizing the resultingly dissolved amide from said water and returning the recovered crystals to said adduct-forming zone.

9. A process for separating an organic compound capable of forming an adduct with an amide selected from the group consisting of urea and thiourea from admixture with an organic compound not capable of forming such an adduct which comprises continually moving particles of said amide as an aggregate mass through an adduct-forming zone, feeding said admixture of organic compounds into said adduct-forming zone to form an adduct therein, withdrawing non-adduct-forming compound from the upper portion of said adduct-forming zone, adding a non-adduct-forming washing medium to the lower portion of said adduct-forming zone to remove any non-adduct-forming compound from said adduct, passing the washed adduct formed in said adduct-forming zone to a decomposition zone, passing an inert heat carrier gas heated to a temperature to decompose said adduct through said decomposition zone countercurrently to said adduct passing therethrough and at a velocity within the range of 3 to 50 feet per second, continuously tumbling said adduct transversely through said heat carrier gas whereby undesirably fine particles of said liberated amide of particle size smaller than 200 mesh are suspended in said carrier gas and are separated from coarser particles, separating said carrier gas from said fine particles of said amide, contacting said separated particles with sufficient water to dissolve said amide therein and recovering the resultingly dissolved amide from said water solvent in a crystalline form suitable for re-use in said adduct-forming zone.

10. In a process wherein crystalline adduct is formed in an adduct-forming zone between an adduct-forming organic compound and an amide selected from the group consisting of urea and thiourea and wherein said adduct is thermally decomposed in a decomposition zone to liberate said amide and the adducted adduct-forming compound and wherein undesirably fine particles of said amide are formed in said adduct-forming and said decomposition zones, the method of decomposing said adduct and separating said undesirably fine particles from desirably coarser particles of said amide which comprises passing said adduct formed in said adduct-forming zone to said decomposition zone, passing an inert heat carrier gas at a temperature within the range of 125 to 200° F. through said decomposition zone countercurrently to the adduct passing therethrough and at a velocity within the range of 3 to 50 feet per second, continuously tumbling said adduct transversely through said heat carrier gas whereby said adduct is decomposed and whereby said undesirably fine particles of said amide are removed from said decomposition zone in suspension in said carrier gas and are separated from coarser particles of size greater than 200 mesh, countercurrently contacting said carrier gas containing said suspended amide with a water solvent at a temperature within the range of 50 to 150° F. and at a rate within the range of 0.5 to 10 gallons per pound of amide, crystallizing the resultingly dissolved amide from said water solvent and returning the recovered crystals to said adduct-forming zone.

11. In a process wherein crystalline adduct is formed in an adduct-forming zone between an adduct-forming organic compound and an amide selected from the group consisting of urea and thiourea and wherein said adduct is thermally decomposed in a decomposition zone to liberate said amide and the adducted adduct-forming compound and wherein undesirably fine particles of said amide are formed in said adduct-forming and said decomposition zones, the method of decomposing said adduct and separating said undesirably fine particles from desirably coarser particles of said amide which comprises passing said adduct formed in said adduct-forming zone to said decomposition zone, passing an inert heat carrier gas at a temperature sufficiently high to decompose said adduct through said decomposition zone countercurrently to adduct passing therethrough and at a velocity sufficient to suspend undesirably fine particles of amide therein and to separate same from coarser particles of size greater than 200 mesh, tumbling said adduct transversely through heat carrier gas, countercurrently contacting said carrier gas containing said suspended amide with water in an amount sufficient to dissolve said amide, and crystallizing the resultingly dissolved amide from said water solvent.

12. In a process wherein crystalline adduct is formed in an adduct-forming zone between an adduct-forming organic compound and an amide selected from the group consisting of urea and thiourea and wherein said adduct is thermally decomposed in a decomposition zone to liberate said amide and the adducted adduct-forming compound and wherein undesirably fine particles of said amide are formed in said adduct-forming and said decomposition zones, the method of decomposing said adduct and separating said undesirably fine particles from desirably coarser particles of said amide which comprises passing said adduct formed in said adduct-forming zone to said decomposition zone, passing an inert heat carrier gas at an elevated temperature countercurrently to adduct passing through said decomposition zone at a velocity sufficient to suspend undesirably fine particles of said amide therein, tumbling said adduct transversely through said heat carrier gas whereby said undesirably fine particles of said amide are separated from coarser particles of size greater than 200 mesh and are removed from said decomposition zone in suspension in said carrier gas and returning only amide of size greater than 200 mesh to said adduct-forming zone.

13. In a process wherein crystalline adduct is formed in an adduct-forming zone between an adduct-forming organic compound and an amide selected from the group consisting of urea and thiourea and wherein said adduct is thermally decomposed in a decomposition zone to liberate said amide and the adducted adduct-forming compound and wherein undesirably fine particles of said amide are formed in said adduct-forming and said decomposition zones, the method of decomposing said adduct and separating said undesirably fine particles from desirably coarser particles of said amide which comprises passing said adduct formed in said adduct-forming zone to said decomposition zone, passing an inert heat carrier gas at an elevated temperature countercurrently to said adduct in said decomposition zone, maintaining the velocity of said carrier gas sufficiently high to suspend undesirably fine particles of said amide therein and to separate same from undesirably coarser particles of size greater than 200 mesh, continuously tumbling said adduct transversely through said heat carrier gas, contacting said carrier gas containing said undesirably fine particles of said amide with water in an amount sufficient to dissolve said amide and crystallizing the resulting dissolved amide in a size suitable for reuse in said adduct-forming zone.

References Cited in the file of this patent
UNITED STATES PATENTS

| | | |
|---|---|---|
| 2,297,034 | Strzyzewski et al. | Sept. 29, 1942 |
| 2,350,730 | Degnen et al. | June 6, 1944 |
| 2,386,734 | Wolk | Oct. 9, 1945 |
| 2,432,744 | Gary | Dec. 16, 1947 |
| 2,499,820 | Fetterly | Mar. 7, 1950 |
| 2,619,501 | Ray | Nov. 25, 1952 |